United States Patent [19]

May

[11] 4,340,412
[45] Jul. 20, 1982

[54] FLOAT GLASS FORMING CHAMBER WITH EXTERNALLY SUPPORTED ROOF

[75] Inventor: Earl L. May, Irwin, Pa.

[73] Assignee: PPG Industries, Inc., Pittsburgh, Pa.

[21] Appl. No.: 222,396

[22] Filed: Jan. 5, 1981

[51] Int. Cl.³ .............................................. C03B 18/16
[52] U.S. Cl. .................................. 65/182.5; 65/182.1; 65/182.3; 65/346; 110/332
[58] Field of Search ............... 65/182.1, 182.3, 182.5, 65/346; 110/332

[56] References Cited

U.S. PATENT DOCUMENTS

| 1,109,553 | 9/1914 | Slick | 122/6 A |
| 1,764,708 | 6/1930 | Abbott | 110/332 |
| 2,699,740 | 1/1955 | Weber | 28/322 |
| 2,699,741 | 1/1955 | Bowman | 28/322 |
| 3,301,651 | 1/1967 | Long | 65/182.1 |

Primary Examiner—Arthur D. Kellogg
Attorney, Agent, or Firm—Dennis G. Millman

[57] ABSTRACT

A float glass forming chamber is provided with a simplified roof structure having a reduced number of vertically extending joints and openings. The roof is comprised of relatively large refractory slabs suspended from above by a hanger arrangement external to the forming chamber enclosure.

14 Claims, 6 Drawing Figures

Fig. 2

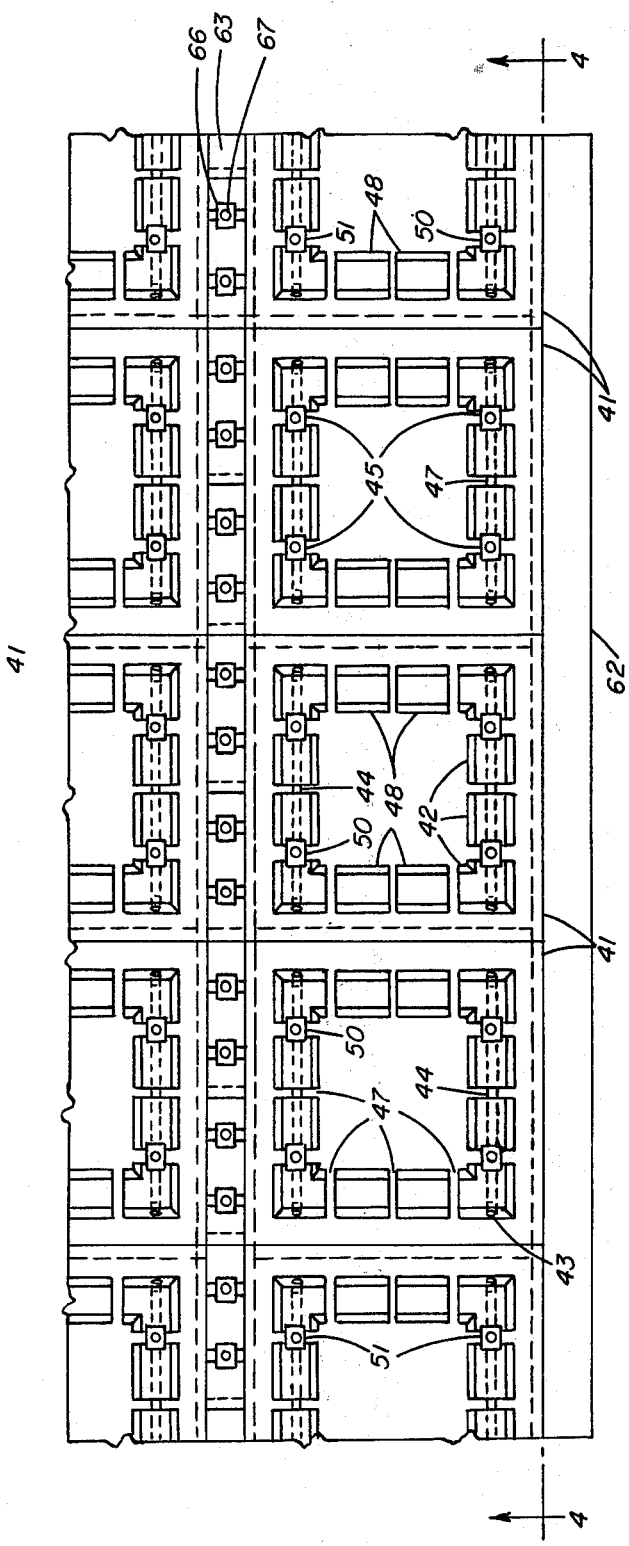
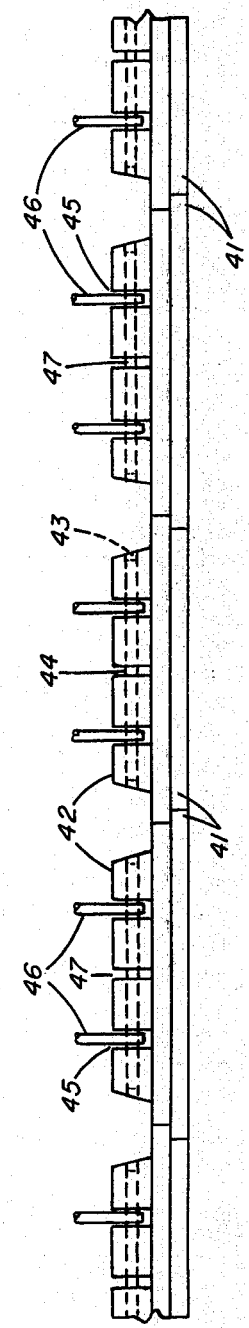

FLOAT GLASS FORMING CHAMBER WITH EXTERNALLY SUPPORTED ROOF

BACKGROUND OF THE INVENTION

In the float process for forming flat glass, molten glass is drawn from a melting furnace and passed to a forming chamber (or "float bath") where the molten glass is deposited onto an elongated pool of molten metal such as tin or copper or alloys thereof. There, a ribbon of glass is stretched to the desired thickness as it progresses along the elongated pool of molten metal and is then withdrawn from the forming chamber as a continuous ribbon at the exit end of the forming chamber. Because of the fluid support provided by the molten metal to the glass, glass of superior optical quality can be produced by the float process.

Unfortunately, a float glass forming chamber is not free from distortion-producing effects. One such effect is the "drip" problem which is caused by dripping of molten droplets of metal or compounds thereof from the roof of the forming chamber onto the glass ribbon. Although the atmosphere within the float forming chamber is usually positively pressurized with an inert or reducing gas atmosphere, sulfur and oxygen are introduced into the chamber from the glass ribbon and from other sources, and these combine with the metal of the molten metal bath to form sulfides and oxides (e.g., tin sulfide and tin oxide) which volatilize and condense on relatively cool portions of the interior surface of the float chamber. The condensate accumulates on the structural members of the bath interior, and under certain temperature and chemical conditions will be reduced to elemental metal (e.g., tin), which eventually falls as droplets onto the glass ribbon. The impact of the metallic droplets on the soft glass ribbon produces indentations which appear as optical distortions in the final glass product. This defect is known variously as "tin drip," "crater drip," "top drip," or "tin speck."

It has now been found that the drippage problem is aggravated by the roof configuration conventionally employed in float forming chambers. The roof design commonly in use comprises a complex grid of relatively small ceramic pieces interlocked with one another and suspended from above by a large number of metallic rods. The design includes a large number of vertically extending electrical heating units supported within openings in the grid. Other openings in the grid are filled with blind plugs. The result is an interior roof surface which is non-planar and has a relatively large surface area and a large number of joints and vertically extending cracks and surfaces. Such a complex roof structure encourages condensation and dripping of volatilization products. The large number of crevices permits ingress of cooler exterior atmosphere which promotes condensation. The non-planar surfaces tend to increase running and coalescing of condensation products. More recent designs of float bath roofs have simplified the support grid design so as to extend across the float chamber in only the transverse direction for the sake of simplified construction. However, the revised design still possesses the drawbacks of a large number of joints and non-planar interior surfaces.

The metallic hanger rods of the prior art necessarily extend close to or into contact with the forming chamber atmosphere while their upper ends are in the cooler environment above the roof so that the rods act as localized heat sinks that have the potential of promoting condensation. Also, openings for the hanger rods extend through most or all of the thickness of the roof which undesirably opens a straight line of communication between the interior and exterior sides of the roof. It would be desirable to eliminate such structural support members that extend through or nearly through the roof.

SUMMARY OF THE INVENTION

In the present invention, the roof of a float glass forming chamber is comprised of large slabs of refractory suspended from above, with a nearly planar, horizontal, interior surface which discourages the formation and dripping of condensed volatiles from the roof onto the glass ribbon. Using a relatively small number of relatively large area slabs reduces the number of joints in the roof structure and simplifies assembly of the forming chamber. Preferably, the slabs are precast from refractory cement material and are provided with rabbeted edges so that adjacent slabs interlock with one another in shiplap fashion. A particular feature of the present invention is a support arrangement for the slabs that provides a relatively uniform distribution of the load so as to avoid localized stresses on the relatively large refractory slabs that could lead to cracking and failure. Moreover, the support arrangement is adapted to engage the top sides of the slabs, thereby avoiding support members which extend through or nearly through the roof elements. The support arrangement includes girder means (e.g., pipes or rods) received within horizontally extending bores in the upper portions of each roof slab for distributing the weight of each slab over a relatively large area. Hangers engage each of the girder means and are, in turn, suspended from overhead beams. Preferably, the horizontally extending bores are located within rib-like projections on the upper side of the slabs which form an integral part of each slab. The ribs also serve to strengthen the slabs against thermal and mechanical stress.

The float chamber roof construction of the present invention is particularly adapted for use with electrical heating elements that extend horizontally from the side walls of the chamber so that no openings through the roof structure need be provided for heating elements. Therefore, each of the roof slabs may present a large, essentially uninterrupted, horizontal, planar surface toward the interior of the forming chamber. Such a feature, together with the minimization of joints, substantially reduces the sources of drippage.

THE DRAWINGS

FIG. 2 is a side view of the preferred embodiment of FIG. 1a partly broken away along line 2—2 in FIG. 1a.

FIG. 3 is a plan view of the roof structure of the preferred embodiment of FIG. 1a.

FIG. 4 is a side view of the roof slabs of FIG. 3 showing their overlapping relationship.

DETAILED DESCRIPTION

Figure 1:
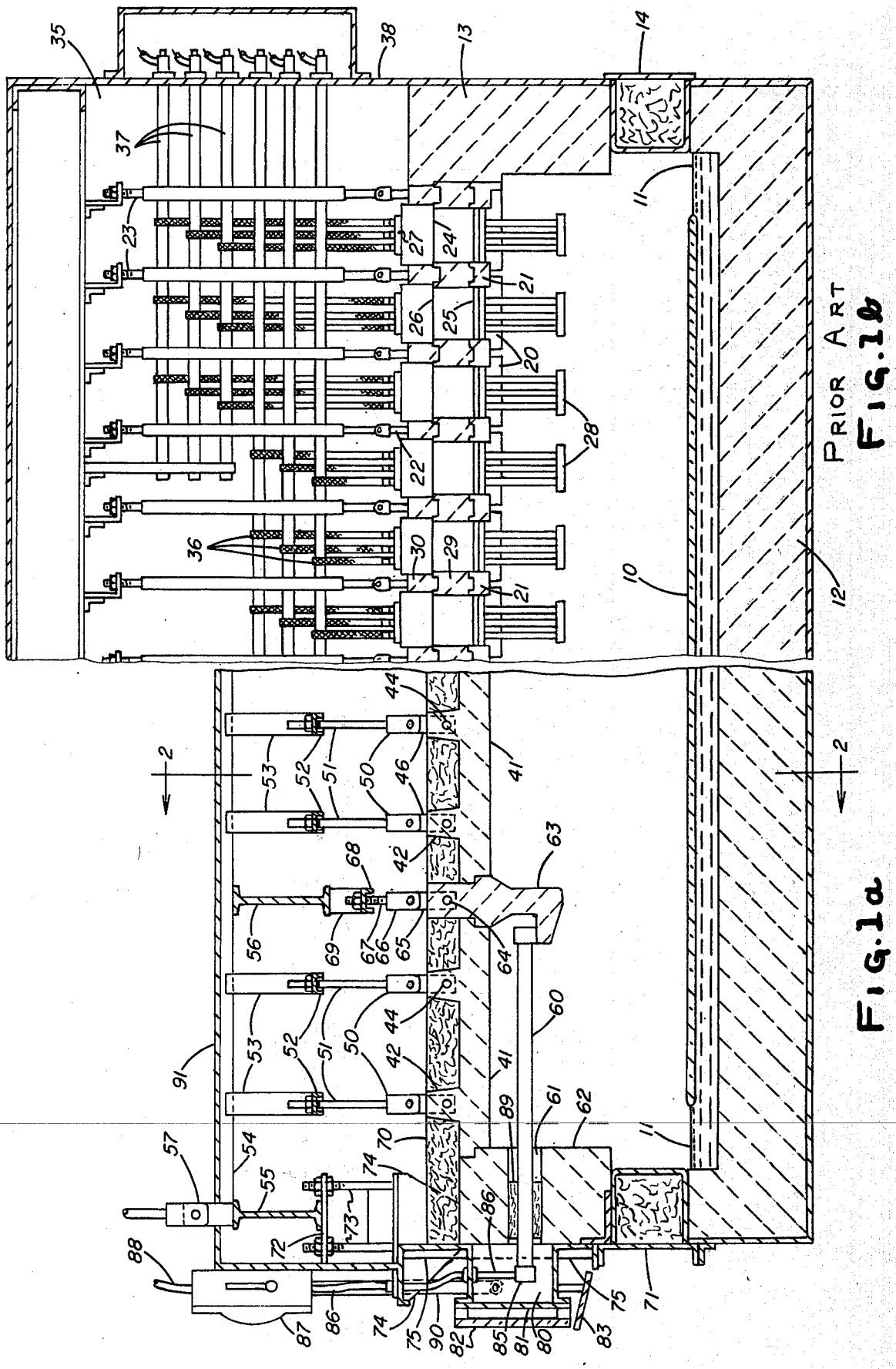
FIG. 1a is a transverse cross-sectional view of a preferred embodiment of a float glass forming chamber in accordance with the present invention.
FIG. 1b is a transverse cross-sectional view of a conventional prior art float glass forming chamber shown for comparison.

In FIG. 1a and FIG. 1b there is shown, side-by-side for comparison, float bath roof designs in accordance with a preferred embodiment of the present invention (FIG. 1a) and the conventional prior art float bath roof (FIG. 1b). In both, a ribbon of glass 10 being attenuated to the desired thickness floats on a pool of molten metal 11 (usually tin, although copper or mixtures of tin and copper may also be employed). Minor amounts of other metals such as iron may also be included in the molten metal bath. The metal bath is contained within a refractory vessel comprising a bottom 12 and side walls 13 having access openings that may be closed by means of side seals 14.

In the prior art roof arrangement, as shown in FIG. 1b, the basic support grid comprises a large number of transversely extending support members 20 and longitudinally extending support members 21, both of which are preformed ceramic pieces. Vertically extending hanger rods 22 have hook-like members at their lower ends (not shown) which engage and interlock the ends of adjacent transverse support members 20. The longitudinal support members 21 span adjacent rows of the transverse support members 20 upon which they rest at opposite ends. The hanger rods 22 are, in turn, supported from above by rods 23 fastened at their upper ends to the overhead superstructure. The spacing between adjacent hanger rods both transversely and longitudinally in such a system is typically on the order of 30 centimeters or less. Into the rectangular openings in this grid are inserted a large number of heater elements, each of which consists of a sandwich of a plurality of pieces of refractory materials 24, 25, 26, and 27 fastened together by means of vertically extending tie rods (not shown) and a vertically extending, three-legged, electrical resistance heating element 28 passing through the refractory pieces. The bottom refractory member 25 of the composite heating element overlaps and rests upon adjacent transverse support members 20. The spaces between the heating elements are filled with additional refractory members 29 and 30, which rest on the longitudinal support members 21 between the hangers 22. Heater elements are shown inserted into each of the grid openings in FIG. 1b as is the case in some zones of a conventional float chamber, but in other zones a particular cross-section may have some or even all of the openings filled with blind plugs rather than heater elements.

The prior art arrangement as shown in FIG. 1b employs a relatively large upper plenum chamber 35 to accommodate electrical connections to the heater elements. Each leg of the resistance heater elements 28 is connected at its upper end to a lead 36 which is, in turn, connected to a bus bar 37 in a three phase alternating current system. Because the float chamber is usually provided with an inert or reducing gas atmosphere, the entire chamber, including the upper plenum, is enclosed in a metal casing 38 to make the structure essentially gas-tight. To prevent oxidation of and to cool the electrical connections with the upper plenum 35, the inert or reducing gas atmosphere is usually fed to the upper plenum 35 from which it passes into the main forming chamber through joints in the roof structure. This infusion of relatively cool gases through the roof structure is also believed to have a detrimental effect on the problem of drippage from the roof.

Figure 2:
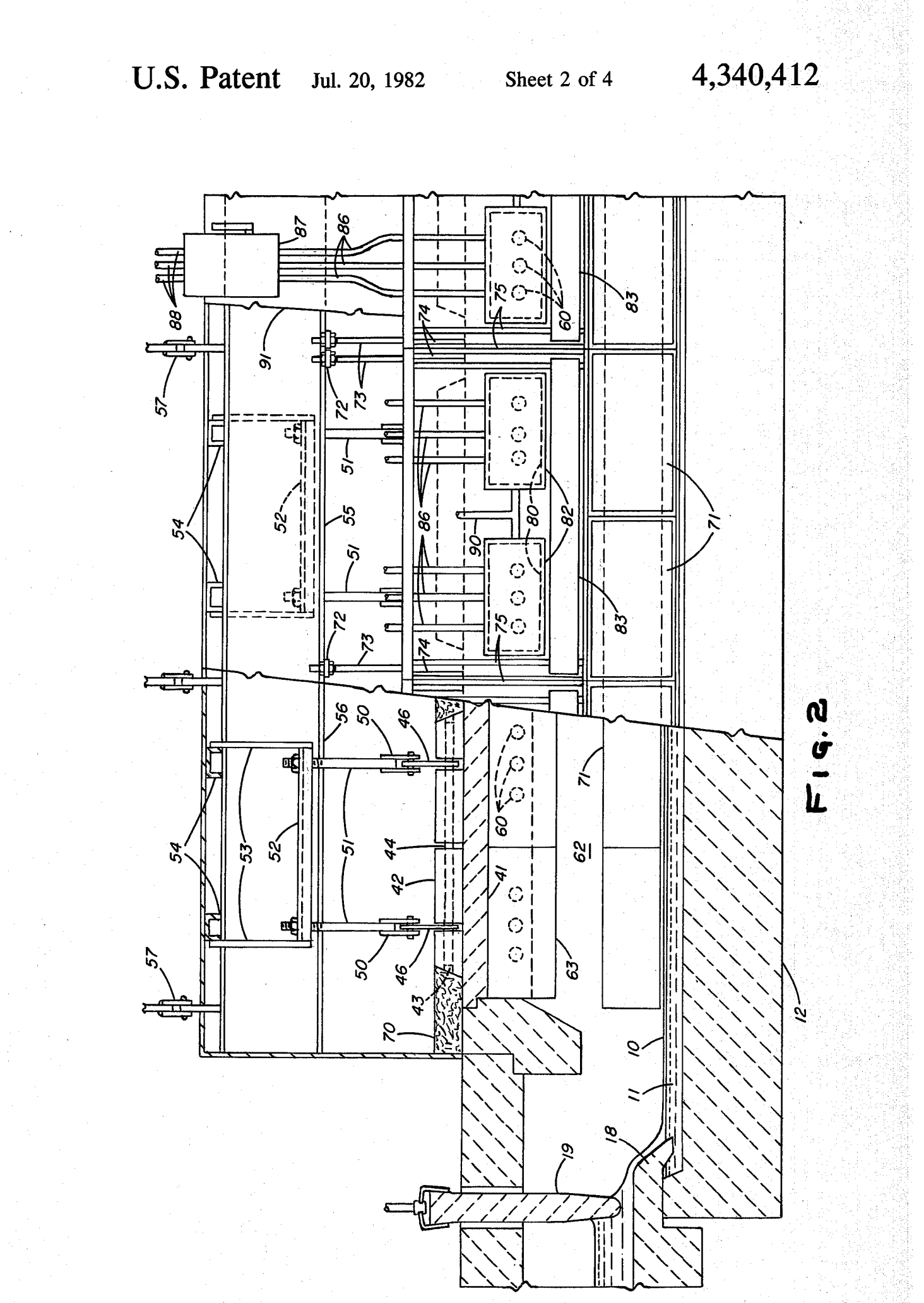

A preferred embodiment of the float chamber roof of the present invention may be seen in FIG. 1a and FIG. 2. Also, in FIG. 2 there may be seen a typical inlet to a float chamber where molten glass is delivered between a threshold 18 and a metering gate or "tweel" 19 onto the molten metal 11 of the float forming chamber. A novel aspect of the invention includes a roof structure in the form of a plurality of flat slabs 41 presenting an essentially horizontal, planar bottom surface to the interior of the float chamber. Such a slab may comprise a joint-free section of the roof much larger than those in a conventional float chamber roof. A slab 41 typically may have at least one horizontal dimension on the order of at least about one half meter and preferably greater than one meter, and a horizontal area of at least about one half square meter. A thickness on the order or 7 to 20 centimeters is typical. In the particular embodiment described in detail herein, a typical slab may have the following dimensions: 1.2 meters by 1.2 meters by 10 centimeters, with ribs an additional 10 centimeters high, 10 centimeters wide, and 1.0 meter long. The actual size of a slab will depend upon the particular refractory being used, the geometry and thickness of the slab, and the operating conditions to which the slab will be exposed. While the maximum benefit would appear to be attained from the use of the maximum sized slab throughout the float chamber, the float chamber roof advantages may be obtained by employing the roof structure of the present invention in only portions of a float chamber, particularly in areas where drippage may be concentrated. Furthermore, constructional expediencies may require that slabs of less than the maximum area be employed in portions of the roof. Although rectangular slabs are shown in the drawings, it should be apparent that the slabs could have any shape in order to conform to any irregularities of the forming chamber structure or to accommodate any ancillary equipment.

It has been found desirable to fabricate the roof slabs 41 by molding a castable refractory material. Castable refractories suitable for use are well-known in the art and are preferably of the type characterized as hydraulic setting refractory concrete. Desirable characteristics include durability and strength at the operating temperatures to which the material will be exposed (up to about 1,000° C.) and chemical resistance to the reducing gas atmosphere usually maintained in the forming chamber. Accordingly, the preferred castable refractories have been found to have alumina contents of about 50 to 70 percent by weight and low iron and sulfur contents. Examples of suitable commercially available castable refractories include those sold under the names "Kaocrete 30" and "Kaocast" (Babcock-Wilcox Company, New York, N.Y., "Alusa" (Harbison-Walker Refractories, Pittsburg, Pa.), and "Purocast" (Kaiser Refractories, Columbiana, Ohio).

Because of the size of the roof slabs 41, it is important to support the slabs with adequate distribution of their weight so as to avoid unduly concentrating stresses in the slabs that could lead to cracking. This is accomplished in the present invention by means of horizontally extending bores 43 in the upper portions of each slab 41, within each of which is received a girder member which may preferably comprise a pipe or rod 44 as shown in the drawings. In the preferred embodiment depicted, the bores 43 are located within rib extensions 42 of the slabs which are integral portions of the slabs formed during molding of the slabs. The ribs 42 provide an effective location from which to support the slabs while minimizing the thickness and thus the weight of the slabs. Alternatively, if the main portions of the slabs are made sufficiently thick, the bores 43 could be located in the main portion of the slabs, in which case ribs would not be required. In the preferred embodiment, each slab is provided with two ribs 42, each with a corresponding bore 43 and pipe 44, but fewer or greater numbers of ribs may be employed depending upon the size of the particular slab.

Figure 5:
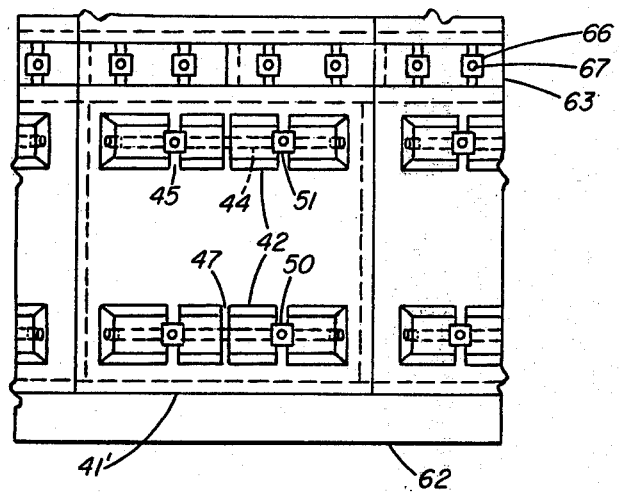
FIG. 5 is a plan view of an alternative roof slab embodiment.

Referring to FIGS. 3 and 4, it may be seen that each rib 42 is provided with a pair of slots 45 through which hanger plates 46 engage the girder pipes 44. A pair of hanger plates 46 are shown engaging each pipe 44, but it should be understood that fewer or greater numbers of plates 46 may be employed depending upon the length to be supported. It is preferred that the ribs 42 and the girder means 44 extend along the majority of the length of the respective slab 41. Two load-bearing ribs per slab have been found sufficient, but is is preferred to provide additional transversely extending ribs 48 on at least slabs located in the hotter portions of the forming chamber. The transverse ribs 48 reinforce the slab and have been found to improve resistance to cracking at high temperatures, apparently by making the shape of each slab more symmetrical thermally. In FIG. 5 there is shown an alternative embodiment of a slab 41' having only a pair of load-bearing ribs 42. Such a slab embodiment is suitable for cooler regions of the forming chamber such as the downstream portions. In order to improve resistance to thermal breaking, it has been found desirable to include notches 47 along the lengths of the ribs in addition to the notches 45 for receiving the hanger plates. These additional notches 47 accommodate thermal expansion and are arranged symmetrically on the ribs. Thus, in the example illustrated in FIG. 3, each rib 42 is notched at its midpoint, and each transverse rib 48 is provided with three notches 47 to match those in each rib 42.

It can be seen in the drawings that each slab 41 is independently supported, and although the edges of adjacent slabs overlap, the slabs and the adjacent structures do not support one another as in prior art forming chamber arrangements. The result is that the area of each slab can be maximized with no more structural strength than required to support its own weight. In the embodiment shown in the drawings four support points are provided for each slab, but it should be understood that a greater or smaller number may be utilized depending upon the size of the slab. The hanger plates 46 may be linked to the overhead main roof structure by any suitable hanger means. In the embodiment illustrated, the hanger means comprise a clevis 50 pinned to each hanger plate 46, and each clevis 50 is affixed to the lower end of a vertically extending hanger rod 51. The hanger rods 51 may be supported in pairs at their upper ends by stringers 52 which, in turn, hand by means of brackets 53 from overhead channel members 54. The channel members 54 extend across the width of the forming chamber and rest on longitudinally extending main roof support beams 55 and 56. The beams 55 and 56 are supported by way of clevis hangers 57 to overhead structural members (not shown).

In conjunction with the roof structure of the present invention it is highly advantageous to employ electrical heating elements which extend into the forming chamber through the side walls thereof rather than through the roof as in conventional prior art forming chambers. In this manner the number of joints in the roof structure can be substantially reduced, and the slabs 41 can have essentially uninterrupted planar inner surfaces. As can be seem in FIG. 1a, it is preferred to employ horizontally extending electrical heating elements 60, each of which may be the same three-legged resistance heaters for use with three-phase alternating current as employed in the vertical mode in prior art forming chambers, but typically of a larger size here. Each heating element 60 extends through an opening 61 in the respective side wall 62, and at its inner end rests upon a refractory support element 63. As can be seen in FIGS. 2 and 3, the heating elements 60, in at least the entrance end of the forming chamber, are spaced at regular intervals along each side wall of the forming chamber. The support elements 63 may abut one another in shiplap fashion to form a substantially continuous row extending longitudinally along at least those portions of the chamber where the heating elements are closely spaced. Each support element 63 may be supported from above in a manner similar to that of the slabs 41. Each support element 63 may be provided with a longitudinally extending load distributing rod or tube member 64 engaged by a hanger plate 65, which is, in turn, hung from a clevis 66 affixed to a vertically extending shaft 67. Each shaft 67 may be affixed to a horizontally extending stringer 68 which is hung from a main support beam 56 by means of downwardly extending tabs 69 (see FIG. 1a). The sides of the support elements 63 may be rabbeted so as to form an overlapping joint with the adjacent roof slabs 41.

The insulating value of the roof may be increased by applying a layer of insulating material 70 over the refractory roof slabs 41. The insulating material may be a high-temperature mineral wool blanket. By selecting the thickness of the insulating layer, the heat flux through the roof may be established, and by employing different thicknesses in different areas, some control over the cooling pattern of the glass ribbon can be achieved. Sealing of the roof joints may also be aided by inserting a layer of refractory fiber paper in the joints of the roof. A suitable refractory paper is an alumina-silica fiber paper sold under the name "Fiberfrax" by Carborundum Company, Niagara Falls, N.Y.

The side walls 62 of the forming chamber are conveniently suspended in sections. The sidewalls are spaced above the basin 12 so as to provide a substantially continuous slot along the length of the chamber for insertion of glass stretching devices and other equipment at substantially any point along the length of the chamber. At locations where equipment is not inserted, the slot is closed by side seal means 71. In the specific embodiment illustrated, each side wall section corresponds approximately to the length of a roof slab 41 and is provided with two rectangular openings 61 for insertion of heater elements. Referring to FIG. 1a, support for each section of the side walls 62 is based upon main support beam 55. Above each end of each side wall section a transversely extending plate 72 is welded to the underside of beam 55 and carries a pair of vertically extending rods 73. The rods 73 at their lower ends are affixed to a bracket structure 74 from which extends downwardly a vertically extending channel member which constitutes the main vertical support member for the side wall section. The channels 75 of adjacent side wall sections are abutted against one another and seated together, thereby providing a continuous, sealed side wall structure.

The electrical connections to each heating element 60 are enclosed in a gas-tight housing 80. Each housing 80 is provided with a removable cover 81, on the outside of which is affixed a heat shield 82. An additional heat shield 83 is mounted below the housings 80. The purpose of both heat shields is to protect the electrical connections within each housing 80 from excessive heat escaping from the forming chamber when a side seal 71 is opened. The heat shield may be made of insulating board material. Within each housing 80 electrical connection is made to the outer end of each leg of the heating element 60 by means of a clamp 85 to which is connected an electrical cable 86 that passes through the wall of the housing to a switchbox 87. Trunk line cables 88 connect each switchbox 87 to a power substation. Such an electrical connection arrangement advantageously eliminates the maze of bus bars associated with prior art designs and provides independent control of each heating element. The ability to cut off power from an individual heating element permits damaged heating elements to be replaced without shutting off the heat from a major section of the forming chamber, and it permits the pattern of heat input to the forming chamber to be quickly altered by shutting off some or all of the heating elements in a particular zone of the forming chamber.

Thermal communication of the hot forming chamber atmosphere with the interior of the electrical connection housing 80 is retarded by fibrous insulation 89 packed into each opening 61 around the legs of the heating elements 60. It is preferred that at least a portion of the non-oxidizing atmosphere of the forming chamber be introduced through the housings 80, whereby corrosion of the electrical connections therein is retarded by the non-oxidizing atmosphere and by the cooling effect of the incoming gas. The non-oxidizing gas may be introduced into some or all of the housings 80 by means of a pipe 90. The gas passes from the interior of the housings into the forming chamber through the porous insulation 89. The entire forming chamber structure is maintained substantially gas-tight by a metal casing 91. Because the electrical connections are located on the side of the forming chamber of the preferred embodiment, the volume above the roof enclosed by the casing 91 is considerably smaller than the enclosed upper plenum space of conventional prior art forming chambers as in FIG. 1b. Additionally, since in the preferred embodiment the nonoxidizing atmosphere is not forced through roof joints, but is introduced around the heating elements, there is less likelihood of inducing condensation and drippage. It may be desired in some cases to introduce additional atmosphere directly into the forming chamber through feeder pipes at other locations.

A specific preferred embodiment has been described in detail for the sake of illustrating the invention and for disclosing the best mode, but it should be understood that other variations and modifications as are known to those of skill in the art may be resorted to without departing from the scope of the invention as defined by the claims which follow.

I claim:

1. Apparatus for forming flat glass by the float process comprising an enclosure adapted to hold a pool of molten metal, means for delivering a stream of molten glass onto the molten metal, and means for drawing the glass along the pool of molten metal so as to form the glass into a ribbon, the improvement comprising: a roof portion of the enclosure formed by a plurality of refractory slabs, each slab having a generally flat horizontally extending configuration and having its vertical dimensions minor relative to its horizontal dimensions, at least one horizontally elongated girder means associated with each slab, a horizontally elongated receptacle in each slab in which is received one of the elongated girder means for distributing the weight of the slab, and a plurality of hanger means engaging each girder at spaced apart locations along the length of the girder and extending from the girder upwardly above the slab to means for supporting each hanger from above.

2. Apparatus for forming flat glass by the float process comprising an enclosure adapted to hold a pool of molten metal, means for delivering a stream of molten glass onto the molten metal, and means for drawing the glass along the pool of molten metal so as to form the glass into a ribbon, the improvement comprising: a roof portion of the enclosure formed by a plurality of refractory slabs, each slab having a generally planar, horizontally extending main body portion facing the interior of the enclosure and a plurality of integral rib projections extending above the main body portion of each slab, and individual hanger means associated with each slab engaging each rib projection at spaced apart locations along the length of the rib and extending upwardly above the ribs to means for supporting the hangers from above.

3. The apparatus of claim 1 or 2 wherein said roof portion that includes a plurality of said refractory slabs presents a surface facing the interior of said enclosure, and the majority of said surface constitutes downwardly facing surfaces of said slabs.

4. The apparatus of claim 3 wherein said downwardly facing slab surfaces are essentially planar.

5. The apparatus of claim 1 or 2 wherein each of said refractory slabs covers a horizontal area of at least one half square meter.

6. The apparatus of claim 5 wherein the horizontal area covered by each slab is at least one square meter.

7. The apparatus of claim 1 or 2 wherein edge portions of the refractory slabs overlap one another.

8. The apparatus of claim 1 or 2 wherein said roof portion covers a section of the forming chamber which includes heating means, and said roof portion is free from the protrusion of heating means therethrough.

9. The apparatus of claim 1 wherein said elongated receptacle is a cylindrical bore, and said girder means comprises a rod-shaped member.

10. The apparatus of claim 9 wherein said bore is located within integral rib projections extending above the main body portion of each slab.

11. The apparatus of claim 1 wherein the length of said receptacle and said girder means exceed one half the major dimension on the respective slab.

12. The apparatus of claim 2 wherein the lengths of said rib projections exceed one half the major dimension of the respective slabs.

13. The apparatus of claim 1 wherein each slab includes at least two of said receptacles and said girder means.

14. The apparatus of claim 1 or 2 wherein said roof portion overlies elongated electrical resistance heating elements whose major dimensions extend in a horizontal direction.

* * * * *